US011316664B2

(12) United States Patent
Kling et al.

(10) Patent No.: US 11,316,664 B2
(45) Date of Patent: Apr. 26, 2022

(54) SYSTEM FOR CHARACTERIZATION AND TRACKING OF ELECTRONIC DATA IN A NETWORKED ENVIRONMENT USING COHESIVE INFORMATION UNITS

(71) Applicant: Bank of America Corporation, Charlotte, NC (US)

(72) Inventors: John Howard Kling, Cincinnati, OH (US); Paul E. Foshee, St. Augustine, FL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 145 days.

(21) Appl. No.: 16/376,314

(22) Filed: Apr. 5, 2019

(65) Prior Publication Data

US 2020/0322133 A1 Oct. 8, 2020

(51) Int. Cl.
*H04L 9/06* (2006.01)
*H04L 9/08* (2006.01)
*H04L 9/32* (2006.01)

(52) U.S. Cl.
CPC .......... *H04L 9/0643* (2013.01); *H04L 9/0861* (2013.01)

(58) Field of Classification Search
CPC ................ H04L 9/0643; H04L 9/0861; H04L 2209/603; H04L 2209/38; H04L 2209/30; H04L 9/3236; H04L 63/0428; G06F 16/1748; G06F 17/30156; G06F 3/0608; G06F 3/0689; G06F 3/0641; G06F 16/24568; G06F 21/64; G06F 21/53; G06F 2221/2149
See application file for complete search history.

(56) References Cited

U.S. PATENT DOCUMENTS

| 6,928,526 | B1 | 8/2005 | Zhu et al. |
| 6,959,384 | B1 | 10/2005 | Serret-Avila |
| 7,373,464 | B2 | 5/2008 | Zhu |
| 7,685,377 | B1 | 3/2010 | Milligan |
| 7,984,014 | B2 | 7/2011 | Song |
| 8,024,306 | B2 | 9/2011 | Palliyil |
| 8,433,679 | B2 | 4/2013 | Crescenti et al. |
| 8,631,052 | B1 | 1/2014 | Shilane et al. |
| 8,667,032 | B1 * | 3/2014 | Shilane ............... G06F 11/3034 707/825 |
| 8,713,513 | B2 | 4/2014 | Sarkar et al. |

(Continued)

*Primary Examiner* — Fatoumata Traore
*Assistant Examiner* — Hamid Talaminaei
(74) *Attorney, Agent, or Firm* — Moore & Van Allen PLLC; Seongun M. Hong

(57) ABSTRACT

Embodiments of the present disclosure provide a system for data characterization and tracking via cohesive information units. In particular, the system may be structured to define a cohesive information unit ("CIU") which may serve as the fundamental functional unit that serves as the basis for data electronically stored, transferred, modified, and/or copied within computing systems. Each CIU may be electronically associated with metadata which serves to identify the CIU as the CIU is stored and/or in motion. Rather than allowing applications and/or users to change the data within the CIU directly, the system may write subsequent CIU's to reflect proposed changes by the applications and/or users. In this way, the system provides a secure and reliable way to maintain authenticity of data within the entity system.

17 Claims, 2 Drawing Sheets

(56) References Cited

U.S. PATENT DOCUMENTS

| | | | |
|---|---|---|---|
| 8,825,678 B2 | 9/2014 | Potapov et al. | |
| 8,908,860 B2 | 12/2014 | Kobayashi et al. | |
| 9,002,792 B2 | 4/2015 | Pittelko | |
| 9,122,729 B2 | 9/2015 | Love et al. | |
| 9,239,687 B2 | 1/2016 | Vijayan et al. | |
| 10,142,115 B2 | 11/2018 | Resch et al. | |
| 10,142,164 B2 | 11/2018 | Ramachandran et al. | |
| 10,536,278 B1* | 1/2020 | Donaldson | G11B 20/10527 |
| 2017/0207910 A1* | 7/2017 | McGregor, Jr. | H04L 9/0618 |
| 2017/0214701 A1 | 7/2017 | Hasan | |
| 2019/0265971 A1 | 8/2019 | Behzadi et al. | |
| 2020/0159891 A1* | 5/2020 | Patel | H04L 9/3239 |
| 2021/0075623 A1* | 3/2021 | Petersen | H04L 9/3247 |

\* cited by examiner

SYSTEM FOR CHARACTERIZATION AND TRACKING OF ELECTRONIC DATA IN A NETWORKED ENVIRONMENT USING COHESIVE INFORMATION UNITS

FIELD OF THE INVENTION

The present disclosure embraces a system for data characterization and tracking via cohesive information units. In particular, the disclosure presents a data-centric architecture which uses hashed data units to allow a system to track and manage data as it be electronically moved or copied to various storage systems in a networked environment.

BACKGROUND

Data security and management systems face a number of technological challenges when using traditional procedures for characterizing data and data usage within a computing environment. As data is moved, copied, and/or stored in multiple different locations, a data security and management system may be increasingly challenged to secure and/or regulate said data, such as when multiple different applications within the computing environment may readily copy and or modify the data over time. In the absence of a way to detect when data has been copied or modified, a data security and management system may experience security issues in preventing data leakage or compromise. Accordingly, there is a need for a more secure way to characterize and track data usage.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present disclosure address the above needs and/or other needs by providing a system for data characterization and tracking via cohesive information units. In particular, the system may be structured to define a data structure which may be referred to herein as a "cohesive information unit" ("CIU") which may serve as the fundamental functional unit that serves as the basis for data electronically stored, transferred, modified, and/or copied within computing systems. Each CIU may be electronically associated with metadata which serves to identify the CIU as the CIU is stored and/or in motion. In some embodiments, each CIU and metadata pair may further be processed through a hash algorithm using an asymmetric cryptography to generate a hash value which is unique to the CIU and metadata pair. Rather than allowing applications and/or users to change the data within the CIU directly, the system may write subsequent CIU's to reflect proposed changes by the applications and/or users. In this way, the system provides a secure and reliable way to maintain authenticity of data within the entity system.

Accordingly, embodiments of the present disclosure provide a system for data characterization and tracking via cohesive information units. The system may comprise a memory device with computer-readable program code stored thereon; a communication device; and a processing device operatively coupled to the memory device and the communication device. The processing device may be configured to execute the computer-readable program code to receive, from a first computing system, a request to generate a data record; generate a first cohesive information unit comprising a first data portion and a first metadata portion associated with the first data portion, wherein the first data portion comprises the data record; generate a hash of the first cohesive information unit; and encrypt the hash of the first cohesive information unit using a private key.

In some embodiments, the processing device is further configured to receive, from the first computing system, a request to update the first data record of the first cohesive information unit; generate a second cohesive information unit comprising a second data portion and a second metadata portion associated with the second data portion, wherein the second data portion comprises an updated data record, wherein the updated data record references the first data record of the first cohesive information unit; and generate a hash of the second cohesive information unit.

In some embodiments, the processing device is further configured to encrypt the hash of the second cohesive information unit using the private key.

In some embodiments, the processing device is further configured to generate a second hash of the first cohesive information unit; detect that the second hash of the first cohesive information unit does not match the hash of the first cohesive information unit; and determine that the first cohesive information unit has been altered.

In some embodiments, generating the hash of the first cohesive information unit comprises receiving the first data portion as an input value into a hash algorithm.

In some embodiments, generating the hash of the first cohesive information unit further comprises receiving the first metadata portion as a second input value into the hash algorithm.

In some embodiments, generating the hash of the first cohesive information unit comprises generating a first data portion hash for the first data portion and a first metadata portion hash for the first metadata portion.

Embodiments of the present disclosure also provide a computer program product for data characterization and tracking via cohesive information units. The computer program product may comprise at least one non-transitory computer readable medium having computer-readable program code portions embodied therein. The computer-readable program code portions may comprise executable code portions for receiving, from a first computing system, a request to generate a data record; generating a first cohesive information unit comprising a first data portion and a first metadata portion associated with the first data portion, wherein the first data portion comprises the data record; generating a hash of the first cohesive information unit; and encrypting the hash of the first cohesive information unit using a private key.

In some embodiments, the computer-readable program code portions further comprise executable code portions for receiving, from the first computing system, a request to update the first data record of the first cohesive information unit; generating a second cohesive information unit comprising a second data portion and a second metadata portion associated with the second data portion, wherein the second data portion comprises an updated data record, wherein the updated data record references the first data record of the first cohesive information unit; and generating a hash of the second cohesive information unit.

In some embodiments, the computer-readable program code portions further comprise an executable code portion for encrypting the hash of the second cohesive information unit using the private key.

In some embodiments, computer-readable program code portions further comprise executable code portions for generating a second hash of the first cohesive information unit; detecting that the second hash of the first cohesive information unit does not match the hash of the first cohesive information unit; and determining that the first cohesive information unit has been altered.

In some embodiments, generating the hash of the first cohesive information unit comprises receiving the first data portion as an input value into a hash algorithm.

In some embodiments, generating the hash of the first cohesive information unit comprises generating a first data portion hash for the first data portion and a first metadata portion hash for the first metadata portion.

Embodiments of the present disclosure also provide a computer-implemented method for data characterization and tracking via cohesive information units. The method may comprise receiving, from a first computing system, a request to generate a data record; generating a first cohesive information unit comprising a first data portion and a first metadata portion associated with the first data portion, wherein the first data portion comprises the data record; generating a hash of the first cohesive information unit; and encrypting the hash of the first cohesive information unit using a private key.

In some embodiments, the method further comprises receiving, from the first computing system, a request to update the first data record of the first cohesive information unit; generating a second cohesive information unit comprising a second data portion and a second metadata portion associated with the second data portion, wherein the second data portion comprises an updated data record, wherein the updated data record references the first data record of the first cohesive information unit; and generating a hash of the second cohesive information unit.

In some embodiments, the method further comprises encrypting the hash of the second cohesive information unit using the private key.

In some embodiments, the method further comprises generating a second hash of the first cohesive information unit; detecting that the second hash of the first cohesive information unit does not match the hash of the first cohesive information unit; and determining that the first cohesive information unit has been altered.

In some embodiments, generating the hash of the first cohesive information unit comprises receiving the first data portion as an input value into a hash algorithm.

In some embodiments, generating the hash of the first cohesive information unit further comprises receiving the first metadata portion as a second input value into the hash algorithm.

In some embodiments, generating the hash of the first cohesive information unit comprises generating a first data portion hash for the first data portion and a first metadata portion hash for the first metadata portion.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
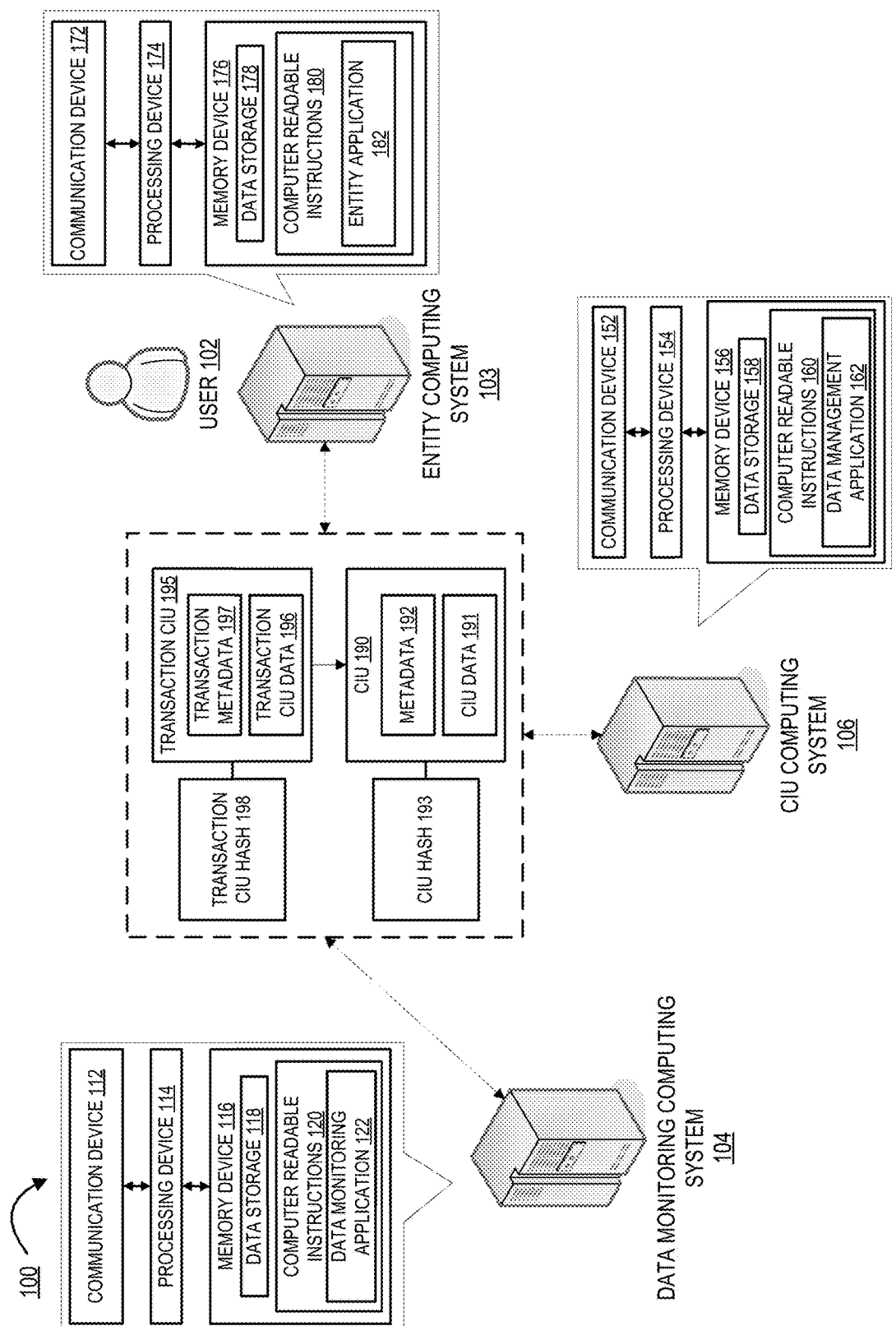
Figure 2:
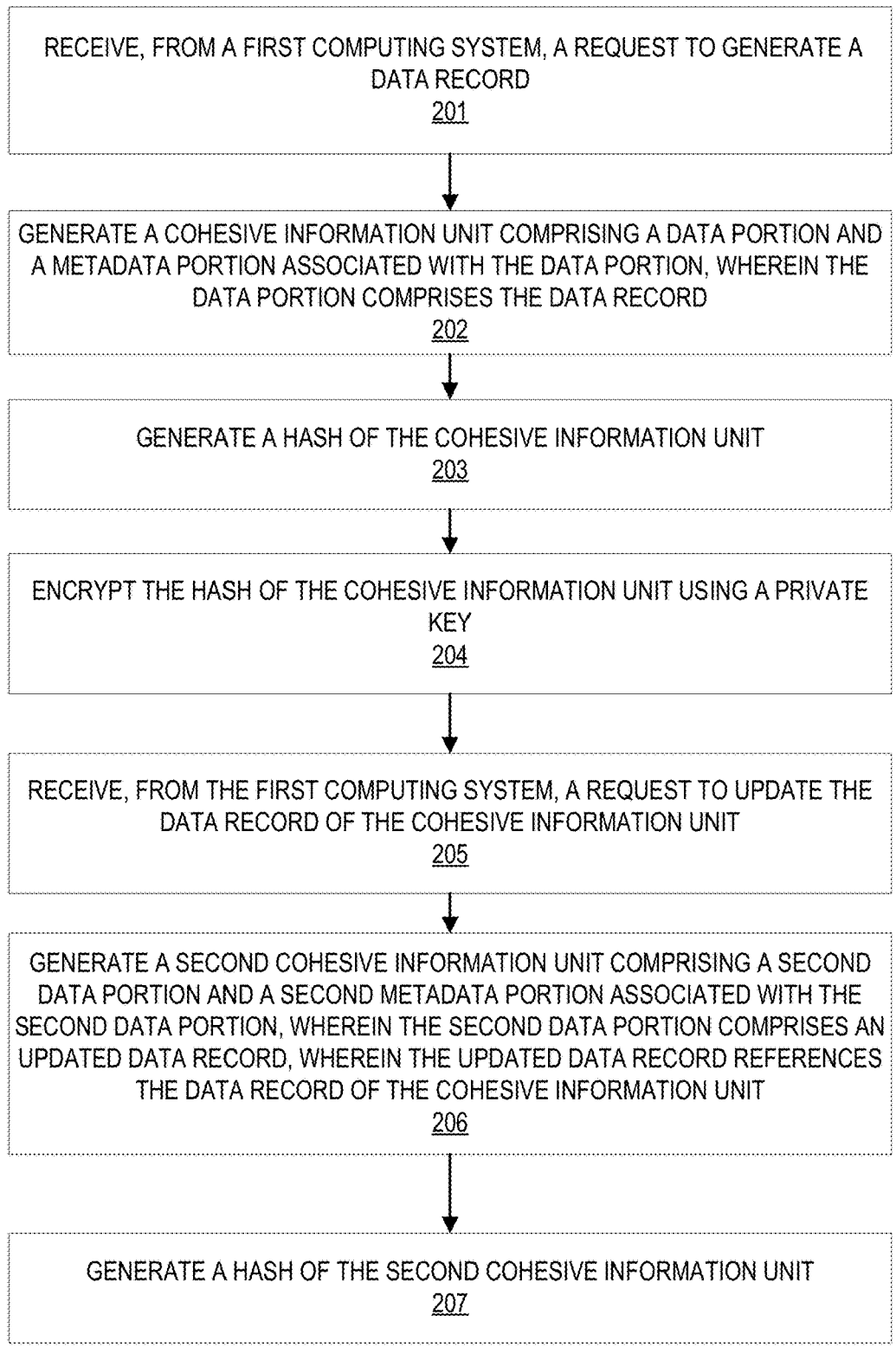

Having thus described embodiments of the invention in general terms, reference will now be made to the accompanying drawings, wherein:

FIG. 1 illustrates an operating environment for the CIU system, in accordance with one embodiment of the present disclosure; and FIG. 2 illustrates a process flow for the CIU system, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" or "CIU system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, as used herein the term "user device" or "mobile device" may refer to mobile phones, personal computing devices, tablet computers, wearable devices, and/or any portable electronic device capable of receiving and/or storing data therein.

"Resource" as used herein may refer to an object under the ownership of a user which is stored or maintained by the entity on the user's behalf. The resource may be intangible or tangible objects such as data files, documents, biographical data, funds, and the like. Typically, the user's account contains records of the resources owned by the user. Account data may be stored in an account database within the entity's systems.

As described above, the entity system may define a functional data structure which may be referred to herein as a "cohesive information unit," "cohesive data unit," or "CIU." The CIU may serve as the core unit for managing data within the entity system. Accordingly, the CIU may comprise a data component which may include information to be stored and/or manipulated by various applications and/or computing systems. For instance, if the entity is a business organization, the data component may include business data such as user or client information, account information, transaction data, organizational information, or the like. The CIU may further comprise a metadata component which contains identifying information about the CIU and the data component, such as data classification, data contents, time stamp, security levels, privacy levels, or the like.

Each CIU generated within the system, along with its associated data and metadata, may be encrypted and/or for data security and integrity verification purposes. Accordingly, in some embodiments, the encrypted values within the CIU become a part of the hash. Thereafter, if the data or metadata within the CIU is modified, corrupted, or otherwise altered, the post-modification hashes associated with the modified data and/or the metadata may no longer match the hashes of the originally created data and/or metadata. Accordingly, in the event that the information within the original CIU needs to be changed or updated, the system may create a new transaction CIU which references the original CIU to be updated, where transaction data within the transaction CIU contains the change to be applied. For instance, if the original CIU comprises user data (e.g., contact information) which needs to be updated, the system may generate a transaction CIU, where the transaction data of the transaction CIU contains the update to be applied (e.g., an updated address). The metadata of the transaction CIU may reference the original CIU such that a chain of CIU's is created. The transaction CIU, along with its transaction data and accompanying metadata may also be hashed for data security/integrity purposes as described above. In this way, the chain of CIU's may serve as a detailed historical log of data starting from the moment that the data is generated within the system and encompassing any changes made to the data as the data is stored and/or manipulated within the system. In some embodiments, different portions or sections of metadata may be encrypted or otherwise restricted based on the content of the CIU. For instance, CIU's containing sensitive private user information may have more (or all) of the metadata encrypted, whereas CIU's containing publicly known information may have freely accessible metadata.

In some embodiments, the system may use asymmetric cryptography to allow applications within the system to verify the authenticity of the data stored in CIU's. In such embodiments, each CIU (and/or the associated data, metadata, or hashes) that is generated by a particular application within the entity system (e.g., an application which creates user account data) may be encrypted by the application via a private key that is specific to the encrypting application. Subsequently, other users and/or applications within the entity system may, using a public key which corresponds with the private key, decrypt the encrypted CIU to verify that the contents of the CIU match the associated hash value.

The system may further comprise one or more data monitoring systems which constantly track the status of CIU's as they are created, stored, manipulated, copied, and/or moved within the entity system. In particular, the data monitoring systems may continuously ping the computing systems which host the CIU's to obtain the statuses of the CIU's and/or verify CIU hashes. In this way, the data monitoring systems may constantly track the generation of new CIU's as well as the movement of CIU's across computing systems (e.g., via moving or copying) within the entity system. In some embodiments, the data monitoring systems may store the status of each CIU in a centralized repository.

The system as described herein confers a number of technological advantages over systems which use conventional data management paradigms. In particular, by using a data unit-centric paradigm, the system may exercise a significantly greater amount of control over the creation, modification, storage, and movement of data, thereby enhancing the security of potentially sensitive data. Furthermore, by using chains of hashed CIU's, the system is able to automatically create a durable and reliable record of changes made to data over a period of time, in contrast to traditional data logging methods which may be inconsistent. For instance, traditional logging methods may be turned on or off, may not be synchronized across multiple computing systems, may be susceptible to tampering or data corruption, or the like.

Turning now to the figures, FIG. 1 illustrates an operating environment 100 for the CIU system, in accordance with one embodiment of the present disclosure. In particular, FIG. 1 illustrates a CIU computing system 106 that is operatively coupled, via a network, to a data monitoring computing system 104 and/or an entity computing system 103. In such a configuration, the CIU computing system 106 may transmit information to and receive information from the data monitoring computing system 104 and/or the entity computing system 103. It should be understood that FIG. 1 illustrates only an exemplary embodiment of the operating environment 100, and it will be appreciated that one or more functions of the systems, devices, or servers as depicted in FIG. 1 may be combined into a single system, device, or server. For instance, the functions of the CIU computing system 106 and the data monitoring computing system 104 may be executed on a single computing system. Furthermore, a single system, device, or server as depicted in FIG. 1 may represent multiple systems, devices, or servers. For instance, the singular data monitoring computing system 104 may represent multiple data monitoring computing systems which simultaneously ping data packets (e.g., CIU's) within the network.

The network may be a system specific distributive network receiving and distributing specific network feeds and identifying specific network associated triggers. The network include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

The computing systems as illustrated in FIG. 1 may, depending on the role of the computing system, be configured to generate, access, track, manage, encrypt, decrypt, hash, digitally sign, or otherwise interact with a CIU 190. The CIU 190 may comprise CIU data 191, where the CIU data 191 contains the information to be managed and/or tracked by the entity system. For instance, CIU data 191 may contain user/client information, application data, operational information, or other types of information that may be routinely processed by the entity system. The CIU 190 may further comprise metadata 192 which may be associated with the CIU data 191 to identify the CIU data 191 and/or the CIU 190. Accordingly, the metadata 192 may comprise information such as a timestamp for creation of the CIU 190, the type or contents of the CIU data 191, the creator/owner of the CIU 190 (e.g., the identity of the application which created the CIU 190), security or privacy levels of the CIU data 191, or the like.

Each CIU 190 may be processed using a hash algorithm (e.g., SHA-1, SHA2, MD5, or the like) to generate a CIU hash 193 which may be stored on one or more of the computing systems depicted in FIG. 1. The CIU hash 193 may be a fixed-length character string which is dependent on the contents of the CIU 190 (e.g., the CIU data 191 and/or the metadata 192). In some embodiments, the CIU hash 193 as depicted in FIG. 1 may represent two separate hash values for the CIU data 191 and the metadata 192. Due to the workings of the hash algorithm, even a minor change in the CIU data 191 or metadata 192 (e.g., a bit flip of a single bit) may cause the hashed value of the CIU 190 to change. Accordingly, once the CIU hash 193 has been generated, the state of the CIU data 191 and/or the metadata 192 as reflected in the CIU hash 193 is considered to be the "authentic" or "original" state of the data. Thereafter, if the state of the CIU data 191 or the metadata 192 were to change (e.g., via improper data manipulation, data degradation or corruption, or the like), the post-change hash of the CIU 190 will no longer match the CIU hash 193, which may signal to the system that the current state of the CIU 190 no longer reflects the original state in which the CIU 190 was created. In some embodiments, the CIU hash 193 may be encrypted via a private key held by the application which generated the CIU hash 193 (e.g., the originating application may digitally sign the CIU hash 193). Subsequently, the other applications within the operating environment 100 may decrypt the CIU hash 193 using a public key to verify ownership of the CIU 190 as well as the security and/or integrity of the information within the CIU 190 (e.g., by generating a hash of the CIU 190 and comparing the generated hash with the CIU has 193).

In an exemplary embodiment, the entity computing system 103 may contain an application which creates and manages client information (e.g., contact information, history of interactions with the client, account information, or the like). In the event that a new client account is created (e.g., the entity is servicing a new client), said application of the entity computing system 103 may generate a client CIU which contains client CIU data, where the client CIU data includes the client information as it exists at the time of creation. The metadata of the client CIU may contain a timestamp for the creation of the client CIU as well as identifying information about the client CIU data (e.g., identify client CIU data as containing personal data, identify the originating application, or the like), security and/or privacy levels of the client CIU data (e.g., an indication of whether the client CIU data comprises sensitive or private information). The client CIU may be hashed to generate a client CIU hash. Thereafter, if any unauthorized changes are made to the client CIU data or metadata within the client CIU, the system may readily detect that such a change was made by comparing the client CIU hash generated at the creation of the client CIU with a post-change hash of the client CIU.

In the event that the information within the CIU 190 needs to be updated or changed, the system (e.g., the creator application and/or the other applications within the operating environment 100) may generate a transaction CIU 195 which may contain transaction CIU data 196 and transaction metadata 197. The transaction CIU 195 (e.g., the transaction metadata 197 and/or the transaction CIU data 196) may include a reference to the CIU 190 to identify the transaction CIU 195 as dependent on the CIU 190. The transaction CIU data 196 may include certain changes to the CIU data 191 within the CIU 190 (e.g., additions, deletions, substitutions, and/or other modifications). The transaction metadata 197 may comprise various types of information about the transaction CIU 195 and/or the transaction CIU data 196, such as the timestamp for creation of the transaction CIU 195, an identifier of the information within the transaction CIU data 196 (e.g., whether the transaction CIU data 196 includes additions, deletions, insertions, or the like), the owner/creator of the transaction CIU 195, or the like. Similar to the CIU 190, the system may hash the transaction CIU 195, including the transaction metadata 197 and/or the transaction CIU data 196 to produce a transaction CIU hash 198. The transaction CIU hash 198 may then be encrypted using a private key (e.g., by the originating application) such that the transaction CIU hash 198 may be decrypted and verified using a public key which corresponds with the private key. If the data requires a further change, additional transaction CIU's may be generated which reference the most recent transaction CIU.

Continuing the previous example, the entity computing system 103 may begin the process of updating a client's contact information (e.g., the client has moved to a new address). In such an embodiment, the client management application of the entity computing system 103 may generate a new transaction CIU which contains an indication that the client's address should be changed to the new address. The new transaction CIU may reference (e.g., via the transaction metadata) the previously existing client CIU which contains the client's contact information as it existed before the update. In this manner, the system may create a series of hashed data units which may serve as a durable log of changes in the CIU data 191 over time.

As illustrated in FIG. 1, the CIU computing system 106 may comprise a communication device 152, a processing device 154, and a memory device 156. The CIU computing system 106 may be owned and/or operated by an entity such as an Internet service provider, financial institution, business organization, government agency, or the like. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 154 is operatively coupled to the communication device 152 and the memory device 156. The processing device 154 uses the communication device 152 to communicate with the network and other devices on the network, such as, but not limited to the data monitoring computing system 104 and/or the entity computing system 103. The communication device 152 generally comprises a modem, antennae, WiFi or Ethernet adapter, radio transceiver, or other device for communicating with other devices on the network.

The memory device 156 may have computer-readable instructions 160 stored thereon, which in one embodiment includes the computer-readable instructions 160 of a data management application 162 which allows the entity system to perform various functions related to data characterization, tracking, management, and other related functions as described herein. In some embodiments, the memory device 156 includes data storage 158 for storing data related to the system environment, but not limited to data created and/or used by the data management application 162. The data management application 162 may comprise computer-executable program code which may instruct the processing device 154 to perform certain logic, data processing, and data storing functions of the application to accomplish the entity's objectives. For instance, the data management application 162 may verify CIU hashes (e.g., the CIU hash 193, the transaction CIU hash 198, and the like), store one or more CIU's and/or CIU hashes, coordinate the linking of CIU's and transaction CIU's, perform encryption and/or decryption of CIU's, or the like.

As further illustrated in FIG. 1, the data monitoring computing system 104 may be a computing system which is owned and/or operated by the entity for the purposes of tracking CIU's as they are stored, moved, and/or copied to various storage locations within the operating environment 100. The data monitoring computing system 104 may be, for example, a networked terminal, server, desktop computer, or the like, though it is within the scope of the disclosure for the data monitoring computing system 104 to be a portable device such as a cellular phone, smart phone, smart device, personal data assistant (PDA), laptop, or the like. The data monitoring computing system 104 generally comprises a communication device 112, a processing device 114, and a memory device 116, where the processing device 114 is operatively coupled to the communication device 112 and the memory device 116. The processing device 114 uses the communication device 112 to communicate with the network and other devices on the network, such as, but not limited to the CIU computing system 106 and/or the entity computing system 103. As such, the communication device 112 generally comprises a modem, antennae, WiFi or Ethernet adapter, radio transceiver, or other device for communicating with other devices on the network.

The data monitoring computing system 104 comprises computer-readable instructions 120 and data storage 118 stored in the memory device 116, which in one embodiment includes the computer-readable instructions 120 of an data monitoring application 122. The data monitoring application 122 may comprise executable code portions for performing functions related to the monitoring of CIU's. For instance, the data monitoring computing system 104 may, via the data monitoring application 122, query computing systems to detect the status of CIU's (e.g., by searching for the associated metadata and/or checking hashes), perform hash verifications, report the status of CIU's to a user (e.g., an administrator using an entity computing system 103), or the like.

The operating environment 100 may further comprise an entity computing system 103. The entity computing system 103 may refer to a computing system which may generate data (e.g., a CIU 190) in order to perform various tasks related to the entity's objectives. In some embodiments, the entity computing system 103 may be operated by a user 102 such as an administrator or employee of the entity. Accordingly, the entity computing system 103 may also comprise a processing device 174 operatively coupled to the communication device 172 and a memory device 176 comprising data storage 178 and computer readable instructions 180.

The computer readable instructions 180 may comprise an entity application 182 which may be configured to instruct the processing device 174 to execute certain functions over the network, such as interacting with the CIU computing system 106, application computing system 105, and/or the data monitoring computing system 104. In particular, the entity application 182 may create, copy, modify, move, or otherwise manipulate data in the form of CIU's as described herein in order to accomplish certain objectives. For example, the entity application 182 may generate business data or user data (e.g., client information, account information, or the like).

The communication device 172, and other communication devices as described herein, may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the entity computing system 103 may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user 102, may include any of a number of devices allowing the devices to receive data from a user 102, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 illustrates a process flow 200 for the CIU system, in accordance with some embodiments of the present disclosure. The process 200 begins at block 201, where the system receives, from a first computing system, a request to generate a data record. The request may be received from a particular application within the entity system. For instance, the data record may include information such as user information (e.g., client contact information, account information, or the like), organizational information (e.g., transactional information, resource inventories, or the like), technical information (e.g., error codes, hardware/software versions, or the like), or any other type of information which may be used, managed, or manipulated by an entity.

The process continues to block 202, where the system generates a cohesive information unit comprising a data portion and a metadata portion associated with the data portion, wherein the data portion comprises the data record. Using the data-centric paradigm of the CIU system, each data record may be incorporated into the CIU structure. Accordingly, the data portion of the CIU comprises the data record to be introduced into the system. In an exemplary embodiment, an application within the entity system (e.g., a client management application) may have requested to add a data record containing a new client's account information. In such an embodiment, the data portion of the CIU may comprise the data record, which includes the new client's account information. Furthermore, the metadata portion of the CIU may contain information related to the data portion of the CIU, such as a timestamp for generation of the CIU, an identifier of information within the data portion (e.g., the metadata may identify the data portion as containing personal and/or private information), an identification of the source or owner of the CIU (e.g., the client management application which caused the CIU to be generated), or the like.

The process continues to block 203, where the system generates a hash of the cohesive information unit. In some embodiments, the system may generate a hash using one or both of the data portion and the metadata portion of the CIU as inputs (e.g., the data portion and/or the metadata portion may be received as input values into the hash algorithm). In other embodiments, the system may generate separate hashes for each the data portion and the metadata portion. Typically, the hash is generated based on the data portion and/or the metadata portion as they exist at the time of creation of the CIU. In this way, the hash is based on the original state of the data and/or metadata. If the data or metadata within the CIU were to change even by a single bit (e.g., due to data corruption, tampering, software glitches, or the like), the hash of the changed data or metadata will no longer match the hash based on the original state of the data and/or metadata, thereby enabling the system to detect that such a change has occurred. Continuing the previous example, if the account information within the CIU were to change (e.g., via unauthorized manipulation of records), hashes of the data portion subsequent to the modification would no longer match the hash generated upon the initial creation of the CIU, which may thereafter alert the entity system that the account information within the CIU is not genuine.

The process continues to block 204, where the system encrypts the hash of the cohesive information unit using a private key. Typically, the private key is owned exclusively by the user and/or application that originally caused the CIU to be generated. The private key may be associated with one or more public keys (which may be held by one or more users and/or applications within the entity system) such that data encrypted by the private key may be decrypted only by the holder of a public key. Once the hash is encrypted using the private key, holders of the public key may decrypt the hash and compare the decrypted hash with a recent hash of the CIU's data portion and/or metadata portion. In this way, the holders of the public key may verify the data integrity of the CIU at any point after the creation of the CIU.

The process continues to block 205, where the system receives, from the first computing system, a request to update the data record of the cohesive information unit. Rather than directly modifying the data within the CIU, the system may indicate the existence of updated information via subsequently created CIU's which reference the CIU to be updated, as described in more detail herein.

The process continues to block 206, where the system generates a second cohesive information unit comprising a second data portion and a second metadata portion associated with the second data portion, wherein the second data portion comprises an updated data record, wherein the updated data record references the data record of the cohesive information unit. As described above, the CIU system may be configured such that data and/or metadata within existing CIU's may not be directly edited. In embodiments in which the data must be updated (e.g., a client's account information has changed), a second CIU (or "transaction CIU") may be generated which references the first CIU. In particular, the data portion of the second CIU may contain an updated data record which references the data record within the first CIU to indicate that the information within the data record of the first CIU should be updated. For instance, the updated data record may indicate that a client's account number X should be changed to account number Y. Furthermore, the metadata portion of the second CIU may indicate that the data portion of the second CIU references the data portion of the first CIU.

The process concludes at block 207, where the system generates a hash of the second cohesive information unit. After the second CIU is generated, the system may create a hash of the second CIU using either or both the data portion and/or the metadata portion of the second CIU. In some embodiments, the hash may further be encrypted using a private key of the application which requested the update and/or created the second CIU. Said private key may subsequently be decrypted using a corresponding public key such that other applications within the entity system may at any time generate a new hash of the second CIU to compare with the originally generated hash of the second CIU. In this manner, the CIU system may generate a chain of CIU's (which in some embodiments may have one or more branches) which may serve as a durable, "always on" log of data processed by the entity system.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for data characterization and tracking via cohesive information units, the system comprising:
   a memory device with computer-readable program code stored thereon;
   a communication device; and
   a processing device operatively coupled to the memory device and the communication device, wherein the processing device is configured to execute the computer-readable program code to:
   receive, from a first computing system, a request to generate a data record;
   generate a first cohesive information unit comprising a first data portion and a first metadata portion associated with the first data portion, wherein the first data portion comprises the data record, wherein the first metadata portion comprises a security level of the first data portion, wherein the security level indicates whether the first data portion contains sensitive data;
   generate a first hash of the first cohesive information unit;
   encrypt the first hash of the first cohesive information unit using a private key;
   track a status of the first cohesive information unit using a data monitoring system, wherein tracking the status of the first cohesive information unit comprises:
      querying a plurality of computing systems within a network, wherein the plurality of computing systems comprises a first storage computing system and a second storage computing system;
      detecting, based on querying the plurality of computing systems, that the first cohesive information unit has been moved from the first storage computing system to the second storage computing system;
      storing the status of the first cohesive information unit to a centralized repository, wherein the status of the first cohesive information unit indicates that the first cohesive information unit has been moved from the first storage computing system to the second storage computing system; and
      reporting the status of the first cohesive information unit to a second computing system;
   generate a second cohesive information unit comprising a second data portion and a second metadata portion associated with the second data portion, wherein the second data portion comprises at least one of an addition, deletion, or substitution to the first data portion, wherein the second metadata portion references the data record of the first cohesive information unit; and generate a second hash of the second cohesive information unit.

2. The system according to claim 1, wherein the processing device is further configured to:

encrypt the second hash of the second cohesive information unit using the private key.

3. The system according to claim 1, wherein the processing device is further configured to:

generate a third hash of the first cohesive information unit;

detect that the third hash of the first cohesive information unit does not match the hash of the first cohesive information unit; and determine that the first cohesive information unit has been altered.

4. The system according to claim 1, wherein generating the first hash of the first cohesive information unit comprises receiving the first data portion as an input value into a hash algorithm.

5. The system according to claim 4, wherein generating the first hash of the first cohesive information unit further comprises receiving the first metadata portion as a second input value into the hash algorithm.

6. The system according to claim 1, wherein generating the first hash of the first cohesive information unit comprises generating a first data portion hash for the first data portion and a first metadata portion hash for the first metadata portion.

7. A computer program product for data characterization and tracking via cohesive information units, the computer program product comprising at least one non-transitory computer readable medium having computer-readable program code portions embodied therein, the computer-readable program code portions comprising executable code portions for:

receiving, from a first computing system, a request to generate a data record;

generating a first cohesive information unit comprising a first data portion and a first metadata portion associated with the first data portion, wherein the first data portion comprises the data record, wherein the first metadata portion comprises a security level of the first data portion, wherein the security level indicates whether the first data portion contains sensitive data;

generating a first hash of the first cohesive information unit;

encrypting the first hash of the first cohesive information unit using a private key;

tracking a status of the first cohesive information unit using a data monitoring system, wherein tracking the status of the first cohesive information unit comprises:

querying a plurality of computing systems within a network, wherein the plurality of computing systems comprises a first storage computing system and a second storage computing system;

detecting, based on querying the plurality of computing systems, that the first cohesive information unit has been moved from the first storage computing system to the second storage location computing system;

storing the status of the first cohesive information unit to a centralized repository, wherein the status of the first cohesive information unit indicates that the first cohesive information unit has been moved from the first storage computing system to the second storage computing system; and reporting the status of the first cohesive information unit to a second computing system;

generating a second cohesive information unit comprising a second data portion and a second metadata portion associated with the second data portion, wherein the second data portion comprises at least one of an addition, deletion, or substitution to the first data portion, wherein the second metadata portion references the data record of the first cohesive information unit; and generating a second hash of the second cohesive information unit.

8. The computer program product of claim 7, the computer-readable program code portions further comprising an executable code portion for encrypting the second hash of the second cohesive information unit using the private key.

9. The computer program product of claim 7, the computer-readable program code portions further comprising executable code portions for:

generating a third hash of the first cohesive information unit;

detecting that the third hash of the first cohesive information unit does not match the hash of the first cohesive information unit; and determining that the first cohesive information unit has been altered.

10. The computer program product of claim 9, wherein generating the first hash of the first cohesive information unit comprises receiving the first data portion as an input value into a hash algorithm.

11. The computer program product of claim 9, wherein generating the first hash of the first cohesive information unit comprises generating a first data portion hash for the first data portion and a first metadata portion hash for the first metadata portion.

12. A computer-implemented method for data characterization and tracking via cohesive information units, the method comprising:

receiving, from a first computing system, a request to generate a data record;

generating a first cohesive information unit comprising a first data portion and a first metadata portion associated with the first data portion, wherein the first data portion comprises the data record, wherein the first metadata portion comprises a security level of the first data portion, wherein the security level indicates whether the first data portion contains sensitive data;

generating a first hash of the first cohesive information unit;

encrypting the first hash of the first cohesive information unit using a private key;

tracking a status of the first cohesive information unit using a data monitoring system, wherein tracking the status of the first cohesive information unit comprises:

querying a plurality of computing systems within a network, wherein the plurality of computing systems comprises a first storage computing system and a second storage computing system;

detecting, based on querying the plurality of computing systems, that the first cohesive information unit has been moved from the first storage computing system to the second storage computing system;

storing the status of the first cohesive information unit to a centralized repository, wherein the status of the first cohesive information unit indicates that the first cohesive information unit has been moved from the first storage computing system to the second storage computing system; and reporting the status of the first cohesive information unit to a second computing system;

generating a second cohesive information unit comprising a second data portion and a second metadata portion associated with the second data portion, wherein the second data portion comprises at least one of an addition, deletion, or substitution to the first data portion, wherein the second metadata portion references the data record of the first cohesive information unit; and generating a second hash of the second cohesive information unit.

13. The computer-implemented method of claim 12, the method further comprising encrypting the second hash of the second cohesive information unit using the private key.

14. The computer-implemented method of claim 12, the method further comprising:

generating a third hash of the first cohesive information unit;

detecting that the third hash of the first cohesive information unit does not match the hash of the first cohesive information unit; and determining that the first cohesive information unit has been altered.

15. The computer-implemented method of claim 12, wherein generating the first hash of the first cohesive information unit comprises receiving the first data portion as an input value into a hash algorithm.

16. The computer-implemented method of claim 15, wherein generating the first hash of the first cohesive information unit further comprises receiving the first metadata portion as a second input value into the hash algorithm.

17. The computer-implemented method of claim 12, wherein generating the first hash of the first cohesive information unit comprises generating a first data portion hash for the first data portion and a first metadata portion hash for the first metadata portion.

* * * * *